(No Model.)
W. C. HASLAGE.
IMPLEMENT FOR COOLING AND STRAINING MIXED BEVERAGES.
No. 302,484. Patented July 22, 1884.
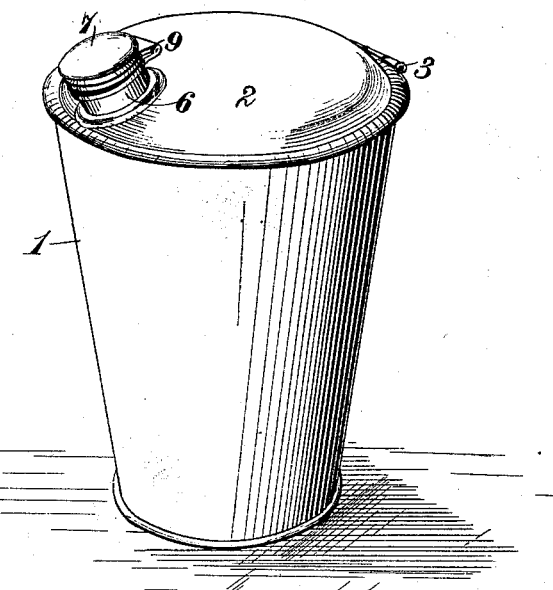
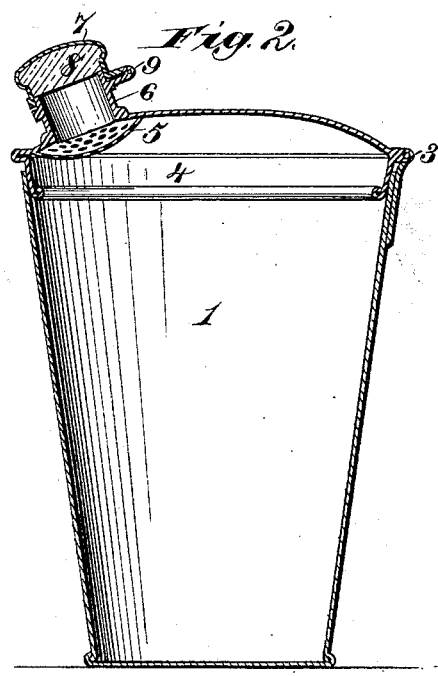
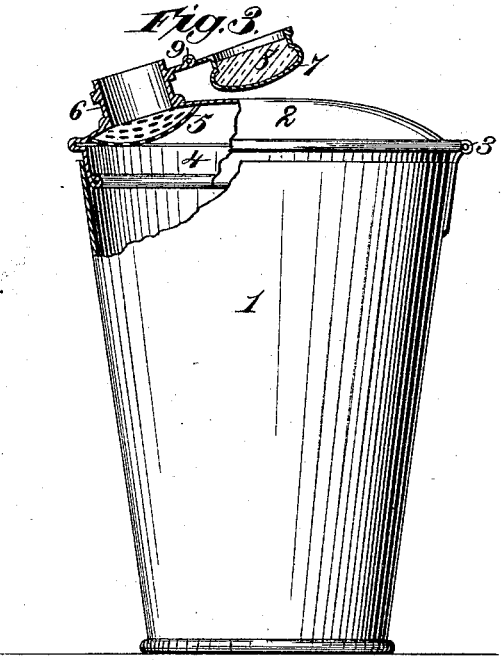
Witnesses.
Robert Errett,
A. H. Norris.
Inventor.
William C. Haslage.
By James L. Norris.
Atty.

United States Patent Office.

WILLIAM CRIST HASLAGE, OF PITTSBURG, PENNSYLVANIA.

IMPLEMENT FOR COOLING AND STRAINING MIXED BEVERAGES.

SPECIFICATION forming part of Letters Patent No. 302,484, dated July 22, 1884.

Application filed June 16, 1884. (No model.)

*To all whom it may concern:*

Be it known that I, WILLIAM C. HASLAGE, a citizen of the United States, residing at Pittsburg, Pennsylvania, have invented new and useful Improvements in Implements for Cooling and Straining Mixed Beverages, of which the following is a specification.

This invention relates to improvements in that class of apparatus for cooling and straining mixed beverages wherein a vessel or goblet is provided with a hinged perforated cover and a rotating perforated plate to close and open the perforations in the cover, whereby the vessel or goblet can be shaken to cool and mix the contents, and the latter then poured and strained through the perforated cover. In such apparatus as heretofore constructed it has been found difficult, if not impossible, to avoid leakage of the fluid contents of the goblet while shaking the same; and the objects of my invention are to effectually avoid that objection and to provide a simple and efficient implement which can be tightly closed when it is desired to cool and mix the materials, and the latter strained when poured into a glass or like receptacle.

To such ends my invention consists in an implement for cooling and straining mixed beverages, combining in its structure the following characteristics, to wit: a vessel or goblet for receiving the ice and materials, a tightly-fitting cover or lid therefor, provided with a strainer, and a tubular neck above the strainer and constituting a pouring-spout, and a cap or stopper adapted to fit the open end of the tubular neck, to tightly close the same and cover or conceal the strainer, whereby the vessel or goblet can be rapidly shaken to cool and mix the contents without any leakage, and the cap or stopper then moved to open the neck and strainer to permit the beverage to be poured out and strained.

In the accompanying drawings, illustrating my invention, Figure 1 is a perspective view of an implement constructed in accordance with my invention; Fig. 2, a vertical central sectional view of the same with the parts in their closed positions, and Fig. 3 a broken sectional view showing the cap or stopper adjusted to open the pouring-spout and uncover the strainer.

In order to enable others skilled in the art to make and use my invention, I will now describe the same in detail, in which the number 1 indicates a vessel or goblet, of metal, glass, or other material suitable for the purpose; and 2, a cover or lid hinged at one edge to the vessel, as at 3, and provided with a pendent flange, 4, to accurately fit into the vessel or goblet and tightly close the mouth thereof. The cover or lid is provided with perforations to constitute a strainer, 5, at one side of its center, and a tubular neck, 6, is secured to the upper surface of the lid over an opening therein and above the strainer, such neck constituting a spout for pouring the mixed beverage through the strainer into a glass or similar receptacle. The cap or stopper 7 is hollow or cup-shaped, and is provided with a packing, 8, on the inner surface of its top wall, to bear closely upon the outer edge of the spout and tightly seal the same when the cap or stopper is adjusted over the spout. The cap is hinged to the outer end of the tubular neck, as at 9, at the side standing adjacent to the hinge of the lid, and in this way all the necessary elements are permanently connected with the implement and brought into such position as to render them convenient of manipulation. In practice the cover or lid is raised on its hinged connection and the ice and other materials to produce the desired beverage introduced. The lid is then tightly closed and the cap held down on the tubular neck by the thumb or finger of the hand in which the goblet is held to shake it for cooling and mixing the beverage, after which the cap is turned on its hinged connection and the contents are poured through the strainer and spout into a glass or like receptacle. The hinge-connection of the cap and tubular neck is preferably made by providing each of these parts with a laterally-projecting lug, 10, united by a knuckle-joint. The strainer is preferably formed by a separate concavo-convex perforated plate soldered at its edges to the inner surface of the lid under the opening therein, which is connected with the tubular pouring-neck, and by this construction the area of the strainer is considerably enlarged beyond the area of the pouring-spout. The vessel or goblet is made tapering, as is also the pendent flange on the lid, so that the tighter the lid is pressed down the more effectually is the vessel sealed or closed, and by the hollow cap slipping over the outer end of the spout to bring its packing in contact therewith a perfect joint is provided to cover the spout and perforations, so that leakage is absolutely prevented.

Having thus described my invention, what I claim is—

1. The combination, in an implement for cooling and straining mixed beverages, of a vessel or goblet, a cover or lid having a strainer and a tubular projecting neck above the strainer, and a cap or stopper to fit upon the open end of the neck for closing the same and covering the strainer, substantially as described.

2. The combination, in an implement for cooling and straining mixed beverages, of a vessel or goblet, a cover or lid therefor, having a strainer and a tubular pouring-neck above the strainer, and a hinged cap to fit upon the open end of the neck for closing the same and covering the strainer, substantially as described.

3. The combination, in an implement for cooling and straining mixed beverages, of a vessel or goblet, a hinged cover or lid having a strainer and a tubular pouring-neck above the strainer, and a cap hinged to the neck for closing the same and covering the strainer, substantially as described.

In testimony whereof I have affixed my signature in presence of two witnesses.

WILLIAM CRIST HASLAGE.

Witnesses:
R. W. MILLER,
C. B. McCONNELL.